US008554189B2

(12) United States Patent
Bruce et al.

(10) Patent No.: US 8,554,189 B2
(45) Date of Patent: Oct. 8, 2013

(54) METHOD AND PROCESS FOR ACTIVATING A TELEMATICS DEVICE WITHOUT A PRE-ACTIVATED MDN

(75) Inventors: Yaovi S. Bruce, Lake Orion, MI (US); Chong Soo Kim, Livonia, MI (US); Matthew R. Mannikka, Detroit, MI (US)

(73) Assignee: General Motors LLC., Detroit, MI (US)

( * ) Notice: Subject to any disclaimer, the term of this patent is extended or adjusted under 35 U.S.C. 154(b) by 86 days.

(21) Appl. No.: 13/114,795

(22) Filed: May 24, 2011

(65) Prior Publication Data

US 2012/0302262 A1 Nov. 29, 2012

(51) Int. Cl.
*H04M 3/00* (2006.01)

(52) U.S. Cl.
USPC ...... 455/418; 455/419; 455/414.1; 455/456.1

(58) Field of Classification Search
USPC .............................. 455/418, 419, 414.1, 456.1
See application file for complete search history.

(56) References Cited

U.S. PATENT DOCUMENTS

| | | | |
|---|---|---|---|
| 7,894,795 B1 * | 2/2011 | Dunne et al. | 455/406 |
| 8,160,581 B2 * | 4/2012 | Zoeckler et al. | 455/433 |
| 2003/0139173 A1 | 7/2003 | Mazzara | |
| 2003/0211854 A1 | 11/2003 | Mazzara | |
| 2004/0012501 A1 | 1/2004 | Mazzara | |
| 2004/0023647 A1 | 2/2004 | Mazzara | |
| 2004/0039574 A1 | 2/2004 | Zelazo | |
| 2004/0203691 A1 | 10/2004 | Mazzara | |
| 2004/0203692 A1 | 10/2004 | Schwinke | |
| 2006/0217109 A1 | 9/2006 | Sobb | |
| 2007/0027625 A1 | 2/2007 | Kamdar | |
| 2008/0120124 A1 * | 5/2008 | Zoeckler et al. | 705/1 |
| 2009/0088187 A1 | 4/2009 | Krause | |
| 2009/0207994 A1 | 8/2009 | Bruce | |
| 2010/0245122 A1 | 9/2010 | Haralson | |
| 2011/0039527 A1 | 2/2011 | Yi | |
| 2011/0039533 A1 | 2/2011 | Yi | |
| 2011/0059734 A1 * | 3/2011 | Dunne et al. | 455/420 |

* cited by examiner

*Primary Examiner* — Danh Le
(74) *Attorney, Agent, or Firm* — Leydig, Voit & Mayer, Ltd.

(57) ABSTRACT

The described principles provide a method and system for circumventing the use of live MDNs and nongeographic prefixes in new vehicle-hosted telematics devices, while allowing the purchaser/user convenient use of the vehicle-hosted telematics device. The telematics unit is programmed or configured from the manufacturer with the same parameters as a cancelled or deactivated unit, with a cleared number for re-acquisition. A geographically specific MIN/MDN is later programmed into the device based on one or more preset locational and other VDU triggers.

17 Claims, 4 Drawing Sheets

US 8,554,189 B2

METHOD AND PROCESS FOR ACTIVATING A TELEMATICS DEVICE WITHOUT A PRE-ACTIVATED MDN

BACKGROUND OF THE INVENTION

Given the scope of the national and international supply chains used in modern manufacturing, an item may be assembled from many pieces that began life thousands of miles apart. Moreover, the final usage location of the assembled unit may be far distant from any supplier. This diversity of supply and assembly makes it difficult to preprogram devices that must have a geographical component to their operation. An example of this phenomenon is the vehicle-hosted telematics unit.

The telematics unit itself may be assembled in a first location, and then integrated into a vehicle in another location, with the vehicle then being shipped to yet another location. Indeed, a purchaser may then take the purchased vehicle to still another location.

Since a telematics unit is a communications enabled device, and because such units communicate wirelessly, e.g., in the cellular spectrum, it is generally necessary to program a telematics device with a MDN (Mobile Dialing Number) to enable use. This has lead to numerous techniques for ensuring that each vehicle-hosted telematics unit has such a number. However, due the geographic diversity of supply, assembly, sale and use as noted above, a geographically specific number may result in excess charges when the vehicle is actually purchased or transported after sale to an area remote from the locale associated with the geographically specific number. Moreover, the assignment of a "live" number to a device that is not yet in use tends to artificially decrease the supply of available numbers.

Although the use of "500" numbers can eliminate some specific issues, the use of 500 numbers tends to cause other problems and concerns. By way of background, "500" numbers, often also referred to as "follow me" numbers, provide a user with single number, e.g., (500) 123-4567, that is programmable to ring any one of a spectrum of possible destinations based on user location, time of day, etc. Thus, 500 numbers are nongeographically specific numbers.

However, the use of such nongeographically specific numbers still requires hardware manufacturers (or wireless carriers) to pre-program a 500 number in the network so that the device is recognized when used. Moreover, preprogramming devices in this way also imposes a shelf life on the device as a result of having a live number in the hardware. Finally, the use of preprogrammed 500 numbers requires adherence to the NANPA (North American Numbering Plan Administration) number utilization policy for 500 Numbers.

BRIEF SUMMARY OF THE INVENTION

The inventors provide a system that avoids the use of live MINs and nongeographic prefixes, while allowing the purchaser/user convenient use of the vehicle-hosted telematics device. In an embodiment, hardware is programmed or configured from the manufacturer with the same parameters as a cancelled or deactivated unit, with a cleared number for re-acquisition. A geographically specific MIN/MDN may be then be later programmed into the device based on one or more preset VDU triggers. The selection of the geographically specific MIN/MDN may be based on GPS coordinates of the vehicle when the triggered VDU call is received. This may be a dealership location or otherwise. In this way, MDN selection can occur prior to vehicle sale, but will still generally yield a number that is local to the end user, e.g., the purchaser.

Other objects and advantages of the invention will be appreciated by those of skill in the art upon reading this description in conjunction with the included figures of which:

DETAILED DESCRIPTION OF THE INVENTION

In general terms, not intended to limit the claims, the invention is directed to a system for providing a geographically specific MIN/MDN for a vehicle telematics device without the use of nongeographic prefixes or live geographically specific numbers. In an embodiment, the hardware manufacturer programs the device with parameters from a cancelled or deactivated unit, with a cleared number for re-acquisition. A geographically specific MIN/MDN is later automatically programmed into the device based on certain criteria to ensure selection of an MDN number that is local to the end user.

Figure 1:
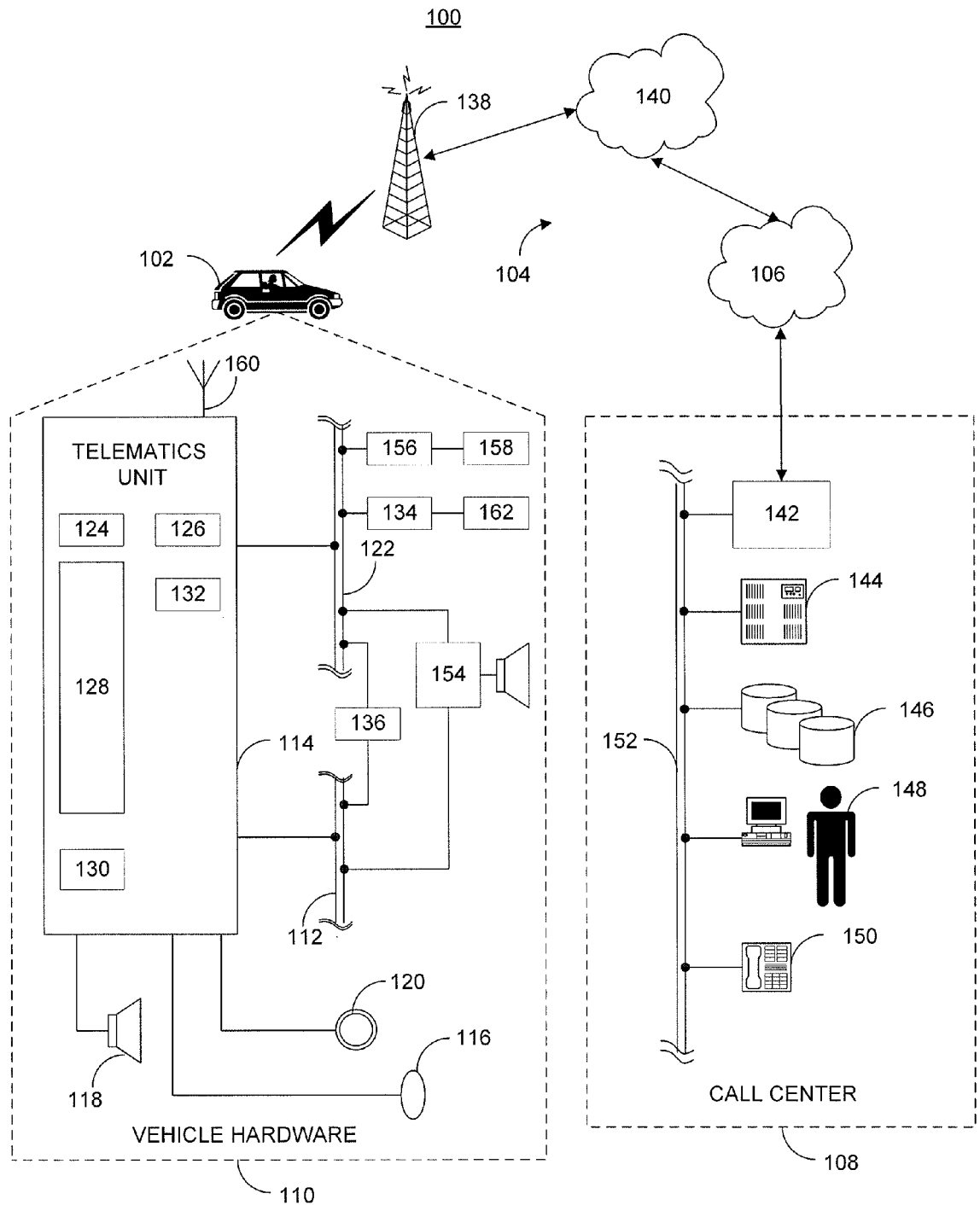
FIG. 1 is a schematic diagram of an operating environment for a mobile vehicle communication system within which the described principles may be implemented.

Given this overview, an exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present system and method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method or form part of the present system as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As discussed in summary above, it is an object of the described system to allow the assignment of a local number to the end user of the vehicle telematics unit 114 without pre-assigning a live number or requiring the use of a 500 or "follow me" number. Initially, the manufacturer of the telematics unit 114 programs it with a cleared number and pre-defined triggers based, for example, on a number of initiation (ignition) cycles or on vehicle mileage. The device is shipped to a vehicle assembly plant where it is installed in a vehicle, and the vehicle is then shipped to a dealer.

The installed hardware tracks the number of ignitions as well as the odometer reading in an implementation to determine if a preset limit for either has been attained. The limits are designed to make it likely that the vehicle is in a geographical location corresponding to its eventual use location prior to number selection. For example, the vehicle may be assumed to be at the local dealership after either 10 ignition cycles or 100 driven miles. Once number selection is triggered, the device places a cleared number call to the telematics service provider.

An application at the service provider evaluates several additional parameters and assigns an MDN based on the current position of the telematics unit (latitude and longitude) if certain criteria regarding the additional parameters are met. These parameters will be discussed in further detail with reference to FIGS. 3 and 4.

Figure 2:
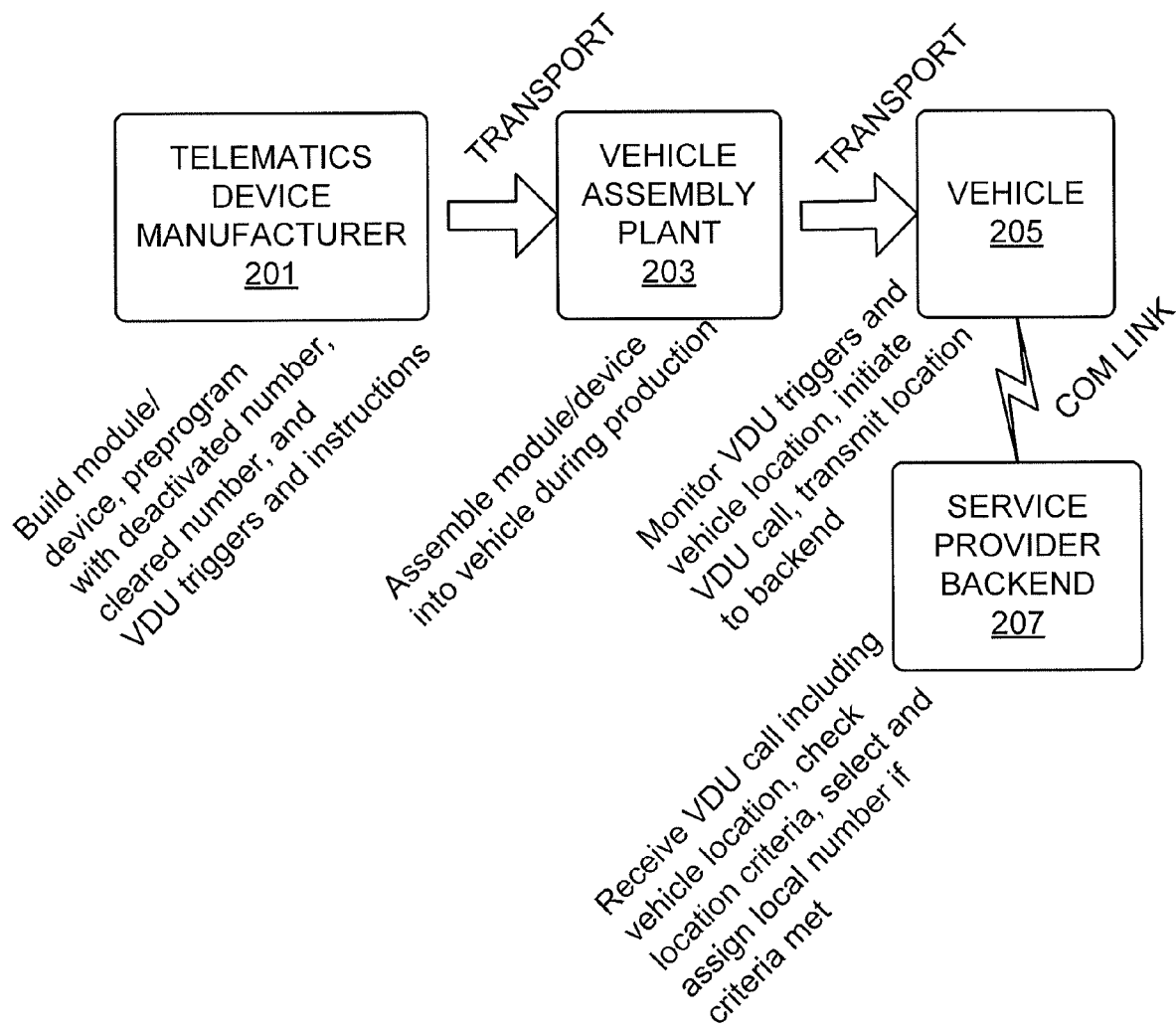
FIG. 2 is a data flow and architecture diagram illustrating the generation and movement of information for telematics device activation in accordance with the described principles.

Referring first to FIG. 2, however, the system architecture is shown in greater detail. The system 200 includes a manufacturing facility for constructing or assembling telematics units, e.g., such as telematics unit 114 of FIG. 1, into a form suitable for integration or installation into a vehicle, such as vehicle 102. This telematics device manufacturer 201 is responsible, in an implementation of the described principles, not only for constructing the device, but also for programming the device with a deactivated number and a cleared number for reacquisition.

The telematics device manufacturer 201 also programs the telematics device with instructions and data for triggering MDN acquisition. The programming of the device with instructions and data may include installing an application with instructions along with a set of criteria, such that the application triggers a VDU call when the criteria are met. Although various criteria may be used, certain criteria are described by way of example later with reference to other figures.

The system 200 further includes a vehicle assembly plant 203 for assembling a vehicle (referred to for purposes of FIG. 2 as vehicle 205) and installing the prepared telematics device from the telematics device manufacturer 201 into the vehicle. As part of the installation, the vehicle assembly plant 203 may link the telematics unit to intra-vehicle communications facilities and sensors, e.g., via a vehicle bus or bus system, to enable the device to obtain data regarding vehicle operation and to allow communication from the telematics unit to vehicle systems as needed.

From the vehicle assembly plant 203, the vehicle 205 is delivered to an endpoint, which may for example, a vehicle dealership. Although the dealership itself does not play a critical role within the described principles, the vehicle 205, and more particularly the telematics device within the vehicle 205, may take certain steps at the dealership. For example, he telematics device within the vehicle 205 will monitor certain aspects of the vehicle operation as programmed by the telematics device manufacturer 201, in order to determine if any trigger points have been reached. The telematics device may verify that the vehicle position has changed significantly after assembly prior to honoring a trigger point, in order to limit excessive calls prior to the vehicle arriving at a dealership.

When a trigger point is reached, and any necessary prerequisites are met as analyzed by the telematics device, the telematics device initiates a call over its wireless link to the telematics service provider backend 207, again pursuant to the programming provided by the telematics device manufacturer 201. As part of this call, the telematics unit obtains the current location coordinates for the unit, and hence for the vehicle, and transfers this information to the telematics service provider backend 207. The call from the telematics device to the telematics service provider backend 207 may be made via the cleared number programmed into the device by the telematics device manufacturer 201.

The telematics service provider backend 207 receives the VDU call including the vehicle location, and checks certain location criteria to determine whether MDN assignment is required. The location criteria will be discussed in further detail below, but certain exemplary criteria include that the position is not near an assembly plant without a customer delivery record and that the position is near a dealership.

When the call is received at the telematics service provider backend 207 and the location criteria are met, as analyzed by the telematics service provider backend 207, the telematics service provider backend 207 proceeds with number assignment for the calling device. In particular, the telematics service provider backend 207 will identify an unused MDN having a prefix rendering the MDN geographically specific to the vehicle's current location, and will program the backend and the vehicle telematics unit with the selected MDN.

It will be appreciated by those of skill in the art that the execution of the various machine-implemented processes and steps described herein occurs via the computerized execution of computer-executable instructions stored on a tangible computer-readable medium, e.g., RAM, ROM, PROM, volatile, nonvolatile, or other electronic memory mechanism. Thus, for example, the telematics device operates according to such stored instructions, including the application installed by the telematics device manufacturer 201.

Figure 3:
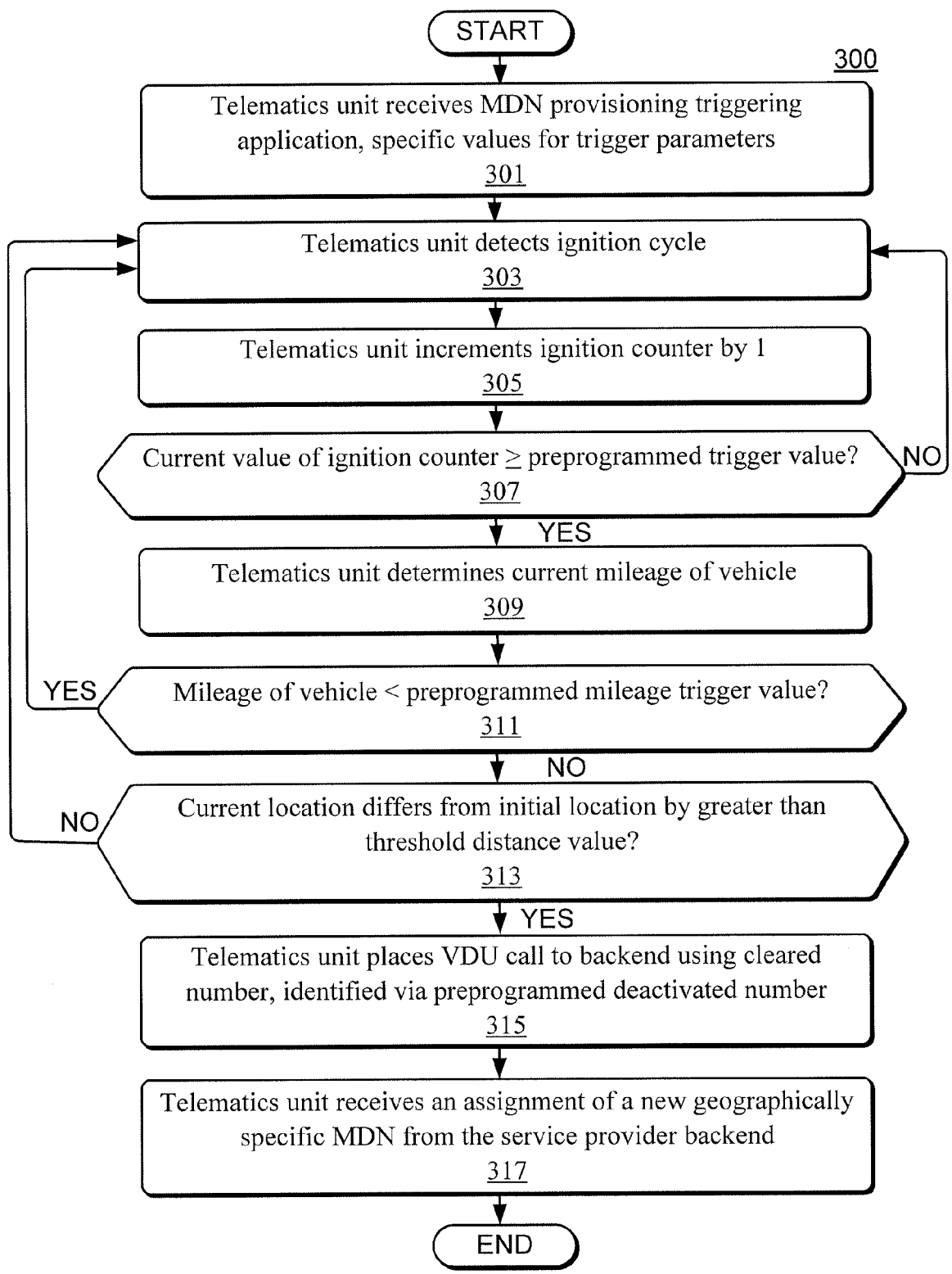
FIG. 3 is a flow chart illustrating a process executed by a telematics device to facilitate MDN assignment.
Figure 4:
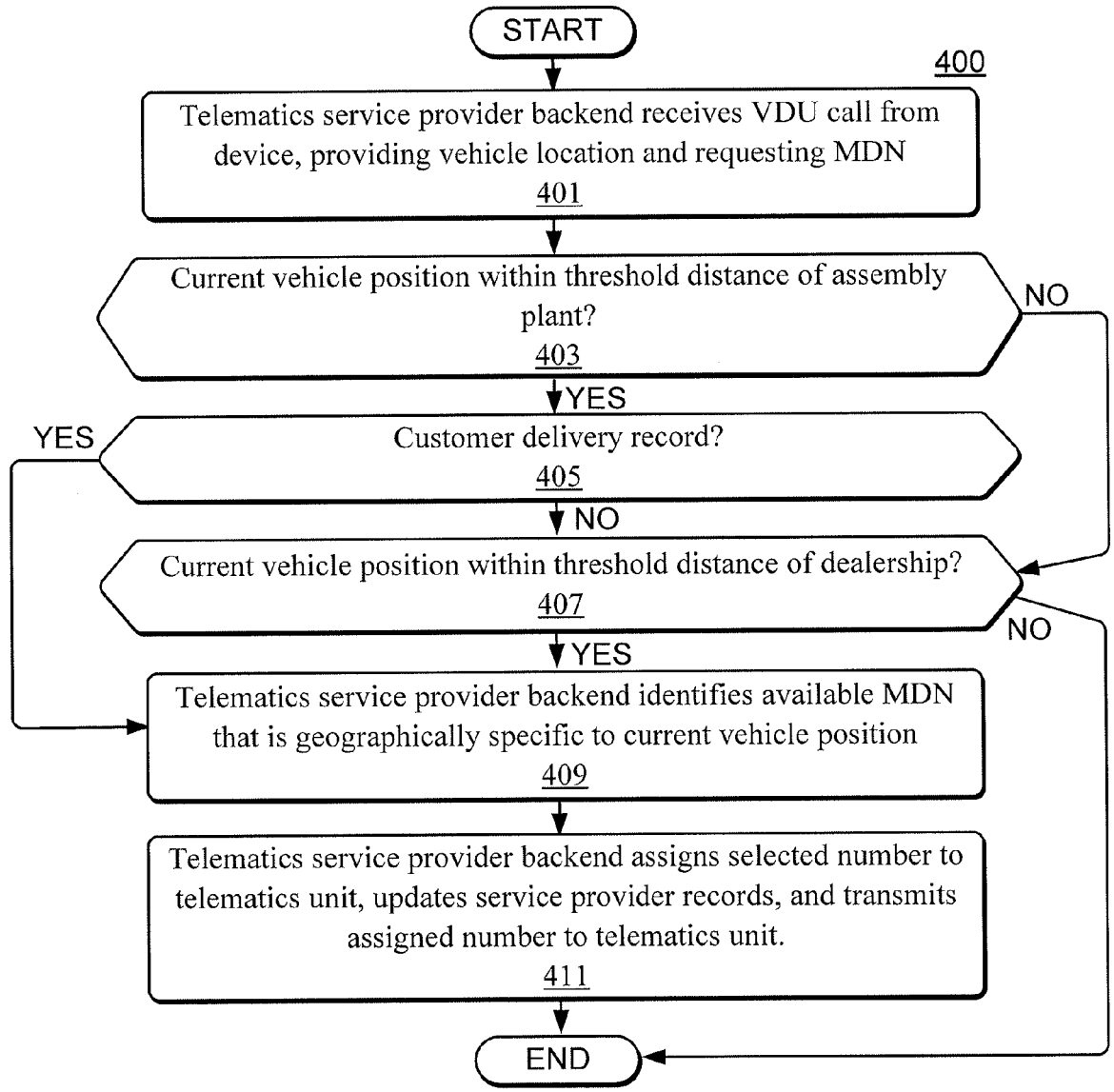
FIG. 4 is a flow chart illustrating a process executed by a telematics service provider backend to facilitate MDN assignment.

The flowchart of FIG. 3 illustrates the process 300 of MDN provisioning from the standpoint of the telematics device, while the process 400, to be discussed later with reference to FIG. 4, illustrates the process of number provisioning from the standpoint of the telematics service provider backend 207.

Continuing now with FIG. 3, the process 300 begins with the telematics unit receiving installation of an MDN provisioning triggering application at the telematics device manufacturer at stage 301. This may be accompanied by the programming of specific values for specific trigger parameters. For example, in an implementation wherein the triggers include the number of miles driven and the number of ignition cycles undergone, the parameter "MilesDrivenTrigger" may be assigned a value such as 100 miles, while the parameter "NumberIgnitionCyclesTrigger" may be assigned a value such as 10.

At stage 303, the telematics unit detects an ignition cycle, i.e., the ignition of the vehicle is turned on. The telematics unit increments a counter, e.g., IgnitionCounter, by 1 at stage 305, and proceeds to stage 307. At stage 307, the telematics unit compares the current value of the ignition counter to the preprogrammed trigger value, e.g., NumberIgnitionCyclesTrigger. If the current value of the ignition counter is equal to or greater than the preprogrammed trigger value, the process diverts to stage 313, which will be discussed later below.

Otherwise, the process 300 flows to stage 309, whereat the telematics unit reads vehicle odometer data to determine the current mileage of the vehicle. At stage 311, the telematics unit compares the current mileage of the vehicle to the preprogrammed mileage trigger value, e.g., MilesDrivenTrigger. If the current mileage of the vehicle is less than the preprogrammed mileage trigger value, the process 300 returns to stage 303. Otherwise, the process 300 continues to stage 313.

At stage 313, the telematics unit evaluates the current vehicle location, e.g., via GPS, and determines whether the current location is different than the vehicle's initial location, when first initialized, by greater than a threshold distance value. If the current location is not different than the vehicle's initial location by greater than the threshold distance value, the process 300 returns to stage 303. Otherwise, the process 300 flows to stage 315, wherein the telematics unit places a VDU call to a service provider backend using the preprogrammed cleared number, and identifying itself via the preprogrammed deactivated number. Finally, at stage 317, the telematics unit receives an assignment of a new geographically specific MDN from the service provider backend, after which the process 300 terminates.

Turning to FIG. 4, this figure illustrates the process of number provisioning according to the described principles from the standpoint of the telematics service provider backend 207. At stage 401 of the process 400, the telematics service provider backend 207 receives a VDU call from the telematics device, providing the vehicle location and requesting assignment of an MDN. The telematics service provider backend 207 checks certain location criteria to determine whether MDN assignment is required. In particular, at stage 403, the telematics service provider backend 207 determines whether the current vehicle position is within a threshold distance of an assembly plant, and if the current vehicle position is within a threshold distance of an assembly plant, the process 400 determines at stage 405 whether there is a customer delivery record. If there is a customer delivery record, the process flows to stage 409. If the current vehicle position is not within a threshold distance of an assembly plant, the process 400 flows to stage 407.

In an alternative implementation, the process checks numerous times for a CDR to guard against a situation wherein the vehicle is sold, but no CDR is received prior to the vehicle departing the dealership, and while at the dealership, the vehicle does not get a good GPS location, and the subscriber does not return to the dealership at any time after the CDR is received. In the implementation to guard against this confluence of events, the telematics unit may continue to periodically check for a CDR rather than checking only at stage 405. In a further implementation the process also checks for other enrollment activity, and may increase efforts to determine if it should assign an MDN if certain mileage limits are exceeded without an MDN being assigned.

Continuing on now, at stage 407, the process 400 determines whether the current vehicle position is within a threshold distance of a dealership for the vehicle type. If it is determined that the current vehicle position is not within the threshold distance of a dealership for the vehicle type, then the process 400 terminates. Otherwise, the process 400 flows to stage 409, wherein the telematics service provider backend 207 identifies an available MDN that is geographically specific to the current vehicle position. Finally, at stage 411, the telematics service provider backend 207 assigns the selected number to the telematics unit in question, updates service provider records, e.g., its own records and other records as needed, with the selected number, and transmits the assigned number to the telematics unit.

Thus it will be appreciated that the disclosed system and method provide a mechanism for assigning a geographically specific MDN to a vehicle-hosted telematics unit without requiring the use of preprogrammed live numbers or 500 numbers. It will also be appreciated, however, that the described systems, methods and implementations are merely examples of the inventive principles, and that these illustrate only preferred techniques. It is contemplated that other implementations of the invention may differ in detail from the foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of assigning a mobile dialing number to a telematics unit, the method comprising:
configuring the telematics unit with an inactive geographically specific Mobile Directory Number (MDN) and a cleared number for dialing;

provisioning the telematics unit to:
    monitor one or more vehicle operation parameters, the one or more operation parameters including location of the vehicle in which the telematics unit is installed;
    determine that the location of the vehicle in which the telematics unit is installed meets preset location criteria; and
    based on the determination that the location of the vehicle in which the telematics unit is installed meets preset location criteria, dial a service provider via the cleared number to provide the location of the vehicle and to request assignment of an MDN, so as to obtain an MDN that is geographically specific to the location of the telematics unit; and
installing the provisioned telematics unit into a vehicle.

2. The method of assigning a mobile dialing number to a telematics unit according to claim 1, wherein the telematics unit is provisioned by installing an application on the telematics unit.

3. The method of assigning a mobile dialing number to a telematics unit according to claim 1, wherein provisioning the telematics unit to monitor one or more vehicle operation parameters further includes provisioning the telematics unit to detect and count a number of ignition cycles experienced by the vehicle.

4. The method of assigning a mobile dialing number to a telematics unit according to claim 3, wherein provisioning the telematics unit further includes provisioning the telematics unit to:
    determine that the number of ignition cycles experienced by the vehicle has exceeded a preset threshold; and
    based on the determination that the number of ignition cycles experienced by the vehicle has exceeded a preset threshold, dial the service provider via the cleared number to provide the location of the vehicle and to request assignment of an MDN.

5. The method of assigning a mobile dialing number to a telematics unit according to claim 1, wherein the preset location criteria require that the current mileage of the vehicle exceeds a preprogrammed mileage trigger value.

6. The method of assigning a mobile dialing number to a telematics unit according to claim 1, wherein the preset location criteria require that the current vehicle location differs from an initial location by greater than a threshold distance value.

7. The method of assigning a mobile dialing number to a telematics unit according to claim 1, further comprising receiving at the telematics unit from the service provider an MDN that is geographically specific to a location of the telematics unit.

8. A vehicle-hosted telematics unit for enabling wireless communication between the vehicle and one or more remote entities, the telematics unit including one or more computer-readable media having stored thereon an inactive geographically specific Mobile Directory Number (MDN) and a cleared number for dialing, and an application for monitoring one or more vehicle operation parameters and placing a call to a service provider to obtain an MDN that is geographically specific to a location of the telematics unit based on the one or more vehicle operation parameters;
    wherein the application for monitoring one or more vehicle operation parameters is adapted to count a number of ignition cycles experienced by the vehicle.

9. The vehicle-hosted telematics unit according to claim 8, wherein the application for monitoring one or more vehicle operation parameters is adapted to monitor a location of the vehicle in which the telematics unit is installed.

10. The vehicle-hosted telematics unit according to claim 9, wherein the application for monitoring one or more vehicle operation parameters is further adapted to determine that the location of the vehicle in which the telematics unit is installed meets preset location criteria and based thereon to dial the service provider via the cleared number to provide the current location to the service provider and to request assignment of an MDN.

11. The vehicle-hosted telematics unit according to claim 10, wherein the preset location criteria require that the current mileage of the vehicle exceeds a preprogrammed mileage trigger value.

12. The vehicle-hosted telematics unit according to claim 10, wherein the preset location criteria require that the current vehicle location differs from an initial location by greater than a threshold distance value.

13. The vehicle-hosted telematics unit according to claim 8, wherein the application for monitoring one or more vehicle operation parameters is further adapted to determine that the number of ignition cycles experienced by the vehicle has exceeded a preset threshold and, based thereon, dial the service provider via the cleared number to provide a current location to the service provider and to request assignment of a mobile dialing number.

14. The vehicle-hosted telematics unit according to claim 8, wherein the application for monitoring one or more vehicle operation parameters is further adapted to receive from the service provider an MDN that is geographically specific to a location of the telematics unit.

15. A method of assigning a mobile dialing number to a telematics unit, the method comprising:
    configuring the telematics unit with an inactive geographically specific Mobile Directory Number (MDN) and a cleared number for dialing;
    provisioning the telematics unit to monitor one or more vehicle operation parameters, the one or more operation parameters including location of the vehicle in which the telematics unit is installed; and to place a call to a service provider to obtain an MDN that is geographically specific to the location of the telematics unit based on the one or more vehicle operation parameters; and
    installing the provisioned telematics unit into a vehicle;
    comparing the current location of the vehicle to a location of an assembly plant for producing the vehicle;
    determining whether a customer delivery record exists for the vehicle if the current location of the vehicle is within a predetermined distance of the assembly plant for producing the vehicle; and
    providing a geographically specific MDN to the telematics unit if a customer delivery record exists for the vehicle or if the current location of the vehicle is not within a predetermined distance of the assembly plant.

16. The method of assigning a mobile dialing number to a telematics unit installed in a vehicle according to claim 15, the method further comprising providing a geographically specific MDN to the telematics unit if a customer delivery record does not exist for the vehicle and the current location of the vehicle is within a predetermined distance of the assembly plant if the current location of the vehicle is within a predetermined distance of a dealership for the vehicle.

17. The method of assigning a mobile dialing number to a telematics unit installed in a vehicle according to claim 16, the method further comprising determining the geographically specific MDN based on one of the current location of the vehicle and the location of the dealership for the vehicle.

* * * * *